2,964,354

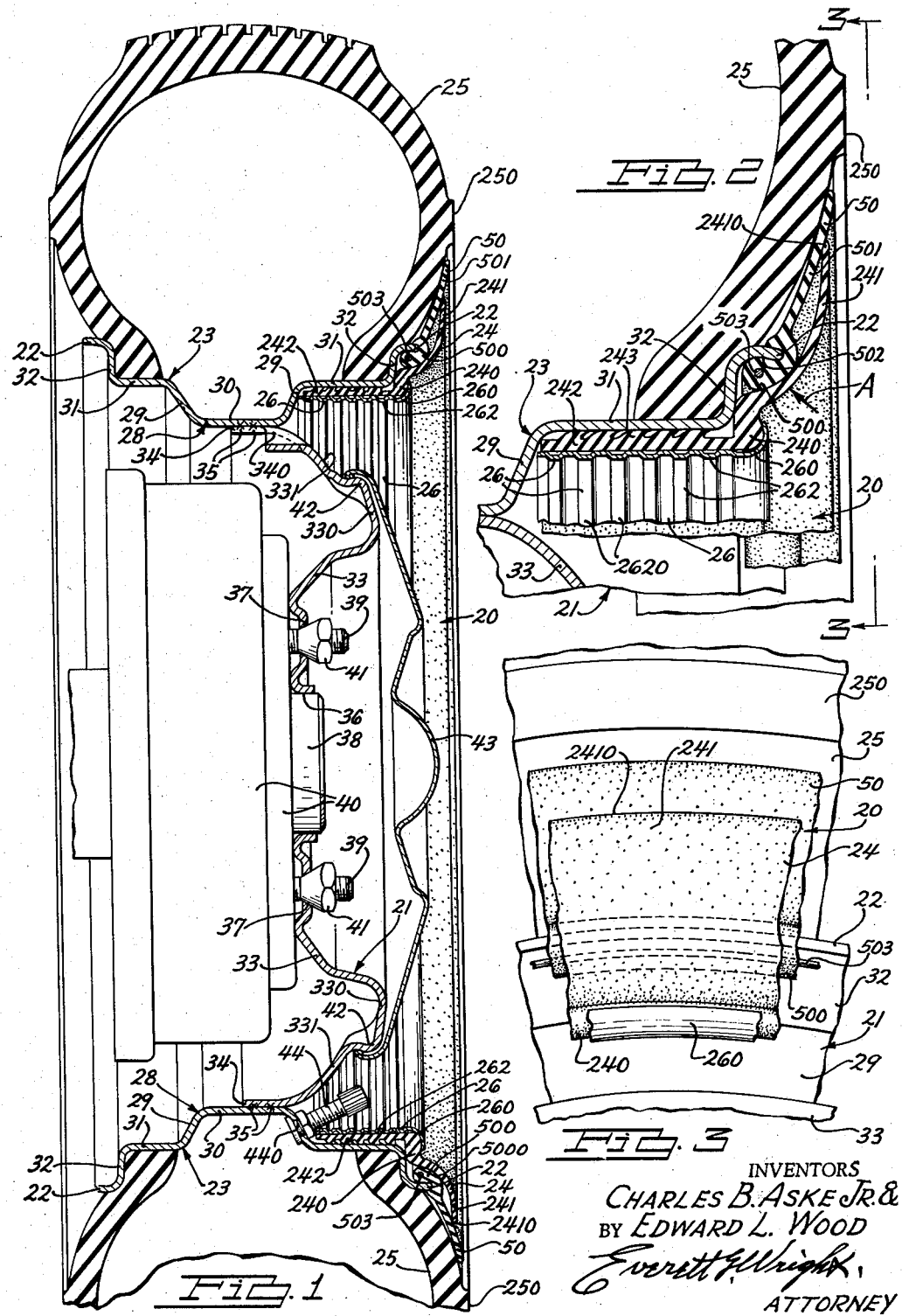

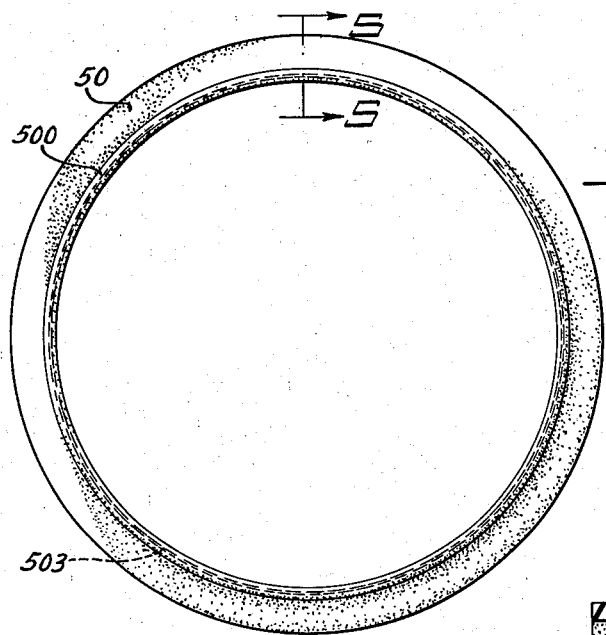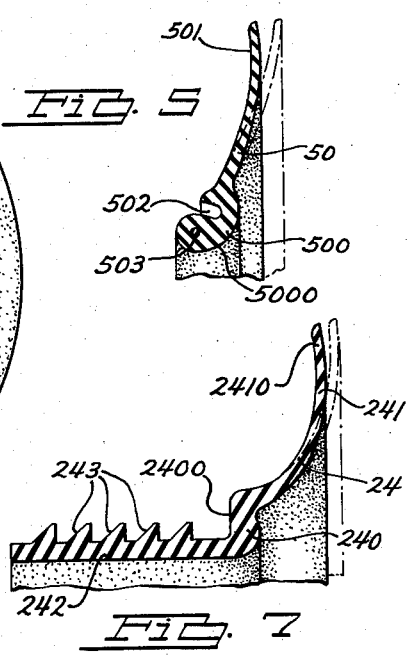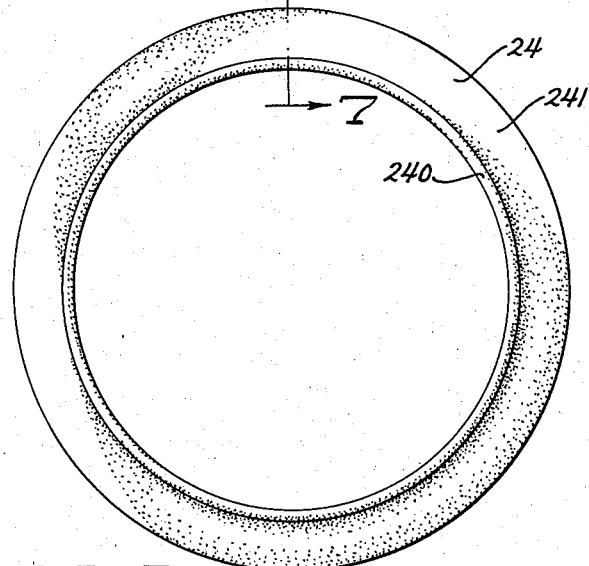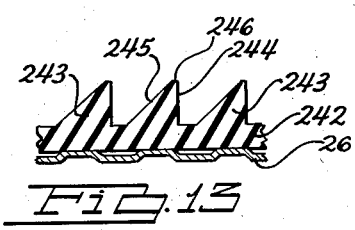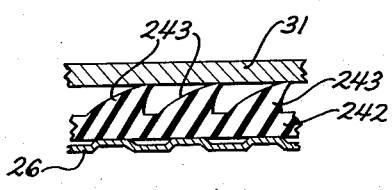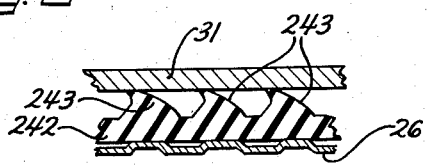
INVENTORS
CHARLES B. ASKE JR. &
BY EDWARD L. WOOD
ATTORNEY Dec. 13, 1960   C. B. ASKE, JR., ET AL   2,964,354
WHEEL TRIM AND MULTI-COLOR TIRE TRIM CONSTRUCTION
Filed March 2, 1960   3 Sheets-Sheet 3
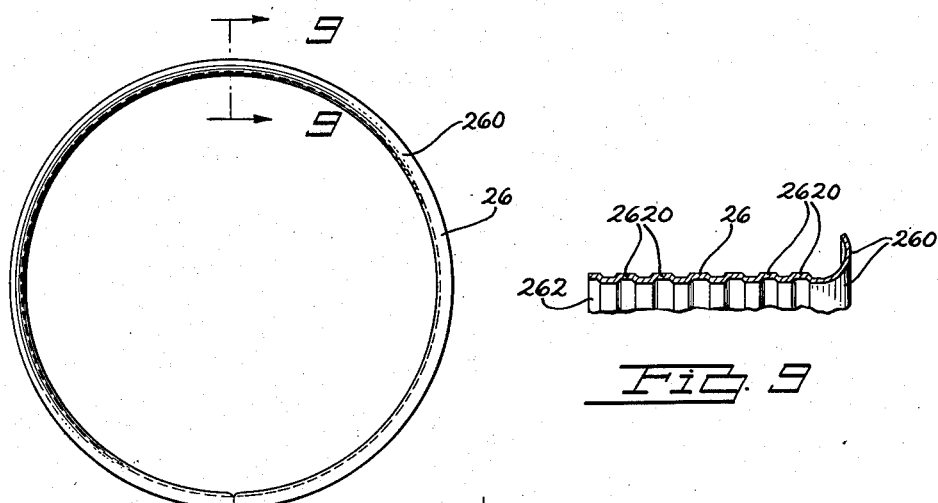
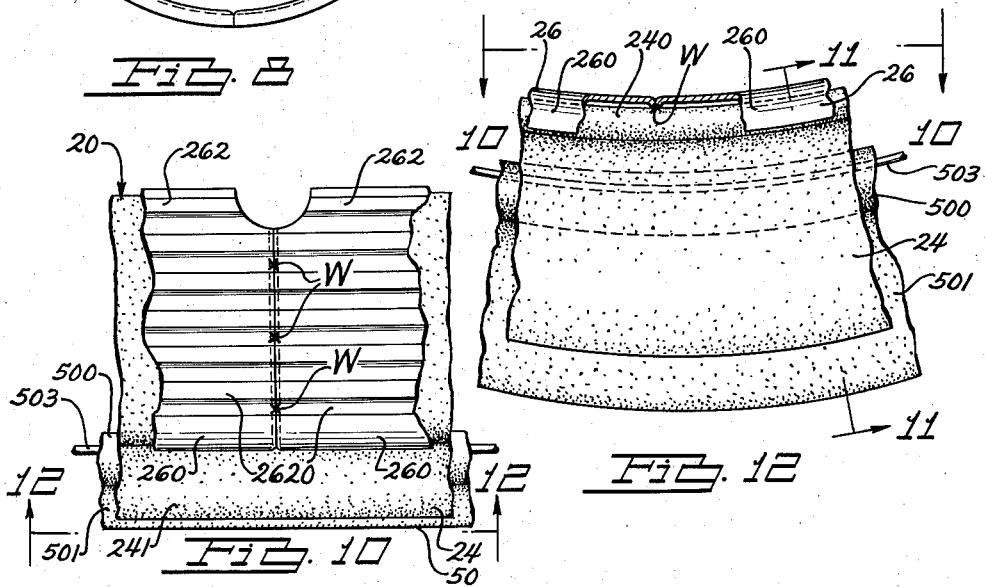
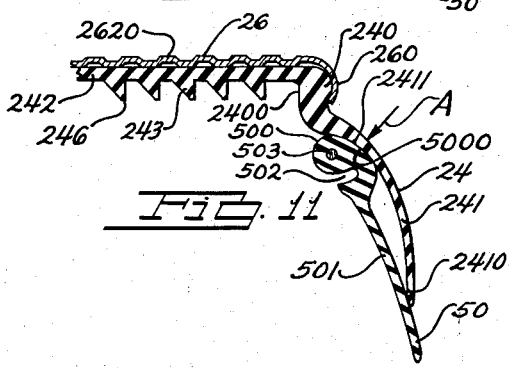
INVENTORS
CHARLES B. ASKE JR. &
BY EDWARD L. WOOD
ATTORNEY United States Patent Office 2,964,354
Patented Dec. 13, 1960

WHEEL TRIM AND MULTI-COLOR TIRE TRIM CONSTRUCTION

Charles B. Aske, Jr., 1278 Pilgrim Road, Birmingham, Mich., and Edward L. Wood, 4684 Audubon, Detroit, Mich.

Filed Mar. 2, 1960, Ser. No. 12,391

7 Claims. (Cl. 301—37)

This invention relates generally to wheel trim-tire trim construction and in particular to providing a combined wheel trim and multi-color tire trim employing a basic tire trim of a selected color such as white and a color accent of any contrasting color such as red, the color accent being readily installed and changed from one accent color to another without removing the wheel trim and basic tire trim.

The primary object of the invention is to provide in combination with a wheel trim a multi-color tire trim employing a basic tire trim of a selected color mounted with the aid of rim trim on the tire bead seat of a wheel rim and a color accent stripe therearound of a selected contrasting color mounted on the lip of the said wheel rim, both being easily and readily mounted on a vehicle wheel and coacting against loss during high speed driving and driving over rough roads, the said accent stripe element being readily removable and replaceable by like but different colored accent stripe elements without the removal of the rim trim and the basic tire trim element.

A further object of the invention is to provide a wheel trim and multi-color tire trim construction including a basic tire trim element overlying an accent stripe element with the latter extending therefrom, the said accent stripe element being formed to engage the lip of the wheel rim and rest at its outer periphery on the wall of the tire while the tire trim bears firmly on the accent stripe element adjacent and radially inwardly of the lip of the wheel rim and lightly adjacent the outer periphery thereof.

Other objects of the invention will become apparent by reference to the following detailed description taken in connection with the accompanying drawings, in which:

Fig. 1 is a vertical sectional view through a vehicle wheel and tire equipped with wheel rim trim and multi-color tire trim construction embodying the invention.

Fig. 2 is an enlarged fragmentary detailed sectional view of the combined rim trim and multi-color tire trim disclosed in Fig. 1.

Fig. 3 is a fragmentary elevational view taken on the line 3—3 of Fig. 2.

Fig. 4 is a side elevational view of the accent stripe element preferably employed.

Fig. 5 is an enlarged cross sectional view taken on the line 5—5 of Fig. 4.

Fig. 6 is a side elevational view of the tire trim element preferably employed.

Fig. 7 is an enlarged crosss sectional view taken on the line 7—7 of Fig. 6.

Fig. 8 is a side elevational view of the rim trim element preferably employed.

Fig. 9 is an enlarged cross sectional view taken on the line 9—9 of Fig. 8.

Fig. 10 is a fragmentary elevational view taken on the line 10—10 of Fig. 12 showing the combined rim trim and tire trim elements assembled together with the accent stripe element shown related thereto in the position assumed by it after the combined rim trim and multi-color tire trim is mounted on a vehicle wheel.

Fig. 11 is a cross sectional view taken on the line 11—11 of Fig. 12.

Fig. 12 is a fragmentary elevational view taken on the line 12—12 of Fig. 10.

Fig. 13 is a greatly enlarged fragmentary sectional view of the wheel trim and anchorage flange portion of the tire trim element shown in Fig. 2 but before mounting on a wheel rim.

Fig. 14 is an enlarged fragmentary sectional view similar to Fig. 13 except that the wheel trim and the anchorage flange portion of the tire trim element has been pressed axially onto a vehicle wheel firmly within the axially disposed tire bead seat annulus thereof showing the attitude assumed by the teeth of the anchorage flange portion of the tire trim element when the rim trim and tire trim elements are assembled and pressed in anchored relationship on a vehicle wheel.

Fig. 15 is an enlarged fragmentary sectional view similar to Fig. 14 showing the attitude assumed by the circumferential teeth of the anchorage portion of the tire trim element when the rim trim-tire trim assembly is being removed from the vehicle wheel.

Referring now to the drawings wherein like reference numerals refer to like and corresponding parts throughout the several views, the embodiment of the invention disclosed therein for illustrative purposes consists of an improved and highly effective vehicle wheel trim and multi-colored tire trim construction which is disclosed in connection with a typical modern vehicle wheel 21 having a tubeless tire 25 mounted thereon.

The said vehicle wheel 21 has a drop center rim 23 composed of a central channel or drop center element 28 having side walls 29 and a base 30. An annular tire bead seat 31 extends laterally outwardly from each side of the side walls 29 of the drop center 28, each said tire bead seat 31 terminating in a tire bead seat flange 32 extending upwardly therefrom which is curved at its upper portion to form an axially disposed outer lip 22. The said tire bead seat flange 32 is ofttimes referred to as the wheel flange and the said lip 22 is ofttimes referred to as the lip of the wheel rim. Within the drop center element 28 of the wheel rim 23 is a wheel spider 33 having an axially disposed flange 34 which is secured to the central channel 28 of the drop center wheel rim 23 by such means as welding at 35. The said wheel spider 33 is provided with a central hub aperture 36 with the securing stud holes 37 spaced therearound to accommodate respectively the wheel hub 38 and wheel securing studs 39 extending from the brake drum 40 to which the wheel 21 is secured by means of the usual wheel securing nuts 41.

The flange 34 of the wheel spider 33 is generally scalloped out and formed at 340 at intervals around the periphery thereof to provide added structural strength to the vehicle wheel 21, and for brake drum ventilation. The said spider 33 is generally formed with an annular axially outwardly extending collar 330 which is preferably provided with a plurality of hub cap retainer nubs 42 over which a conventional hub cap 43 is sprung for securement onto the vehicle wheel 21. The said spider collar 330 has an annular exposed painted surface 331 extending from the outer periphery of the hub cap 43 to the bottom of the painted drop center wheel rim 23. The particular tire 25 illustrated in the drawings is a modern tubeless tire having a scuff bead 250, and, if a tubeless tire 25 is used on the vehicle wheel 21, a valve stem 44 is mounted in sealed relationship through a valve stem aperture 440 preferably provided in the outer wall 29 of the drop center rim channel 28 of the wheel rim 23.

The particular wheel trim and multi-colored tire trim construction of the invention disclosed throughout the drawings comprises three elements, a tire trim element 24 of rubber, synthetic rubber or other suitable material, a rim trim element 26 preferably of stainless steel or other relatively rigid material, and an accent stripe element 50 also of synthetic rubber or the like, the said tire trim element 24 and accent stripe element 50 being of contrasting colors such as white for the tire trim element 24 and red, green, yellow, blue or other color for the accent stripe element 50 which not only contrast with the color of the tire trim element but also may be selected to blend with or match the color of the vehicle body or its exterior or interior trim.

The said tire trim element 24 and the rim trim element 26 are preferably assembled into a rim trim and tire trim assembly hereinafter called the wheel trim assembly 20 prior to mounting on the annular tire bead seat 31 of the wheel rim 23 while the accent stripe element 50 may be mounted on the outer lip 22 of the vehicle wheel rim 23 either before or after the mounting of the said wheel trim assembly 20 on the vehicle wheel rim 23; however, the said tire trim element 26 of the said wheel trim assembly 20 coacts with the accent stripe element 50 as hereinafter described to assure that the said accent stripe element 50 is maintained in proper position on the vehicle wheel at all times.

The tire trim element 24 of the wheel trim and multi-colored tire trim of the invention preferably consists of an annular bead portion 240, an annular curved preferably white or other colored side wall portion 241 extending radially outwardly from the said bead portion 240, and an annular anchorage flange portion 242 extending axially inwardly from the said bead portion 240; the said anchorage flange portion 242 including a plurality of circumferential axially spaced teeth 243 disposed radially outwardly therefrom.

The rim trim element 26 of the wheel trim assembly 20 preferably consists of a ring or sleeve including an axially outer bead portion 260 and an annular ornamental sleeve portion 262 extending axially inwardly from the said bead portion 260. The said bead portion 260 of the rim trim 26 conforms with and is juxtaposed to the bead portion 240 of the tire trim element 24 when the annular anchorage flange portion 242 of the tire trim element 24 is telescoped over the annular sleeve portion 262 of the rim trim element 26 to constitute the wheel trim assembly 20. Figs. 10, 11 and 12 show the assembled relationship of the rim trim element 26 and the tire trim element 24 together with the accent stripe element 50, all located in their inter-related position assumed by them when mounted on a vehicle wheel. The ornamentation of the sleeve portion 262 of the rim trim element 26 is shown to be circumferentially ribbed at 2620; however, other ornamentation of the rim trim element 26 may be employed to provide other desirable reflective patterns which pick up and reflect the color of the exposed painted surface 331 of the wheel spider 33. If the rim trim element 26 is rolled into its annular shape, the joint therein may be secured together by any suitable means, as for example, by welds W, see Figs. 10 and 12.

Each of the circumferential radially outwardly disposed teeth of the annular flange portion 242 of the tire trim element 24 is preferably formed substantially triangular in cross section with a generally radially disposed axially outwardly facing wall 244 and an axially inwardly sloping wall 245. The said radially disposed axially outwardly facing teeth 243 of the tire trim element 24 shown in enlarged detail in Fig. 13 are suitably spaced so as to permit the apex 246 thereof to flex axially outwardly and radially inwardly when the wheel trim assembly 20 is mounted axially onto a vehicle wheel rim 21 as hereinafter described. The apex 246 of each of the said circumferential teeth 243 may be slightly truncated to permit them to roll over from their locked position against the inner periphery of the tire bead seat 31 of the wheel rim 23 as shown in Fig. 14 to their unlocked position shown in Fig. 15 to free the gripping of the said tire bead seat 31 by the said circumferential teeth 243 when the said wheel trim assembly 20 forcibly removed axially from a vehicle wheel 21 as hereinafter described.

The tire trim element 24 and the rim trim element 26 of the wheel trim assembly 20 are of such diameter in respect to each other that the anchorage flange portion 242 of the tire trim element 24 may be telescoped or otherwise firmly anchored in assembled relationship onto the sleeve portion 262 of the rim trim element 26, see Fig. 11. When the tire trim element 24 and the wheel trim element 26 are so assembled, the diameter of the apex 246 of the radially disposed axially outwardly facing circumferential teeth 243 is somewhat greater than the internal diameter of the annular tire bead seat 31 of the vehicle wheel 21.

The wheel trim assembly 20 is mounted on the vehicle wheel 21 by forcibly telescoping the rim trim element 26 and the anchorage flange portion 242 of the tire trim element thereof as a unit within the internal annulus of the tire bead seat 31 of the said vehicle wheel 21. This deforms the circumferential teeth 243 of the anchorage flange portion 242 of the tire trim element 24 from their normal attitude shown in Fig. 13 to their gripping position shown in Fig. 14. The said tire trim assembly 20 is axially pressed onto the vehicle wheel 21 until the inner axially facing flange 2400 of the bead portion 240 of the tire trim element 24 is located in abutment with the flange 32 of the tire bead seat 31 of the said vehicle wheel 21. The wheel trim assembly 20 is now firmly anchored onto the rim 23 of the vehicle wheel 21, and the curved white or colored side wall portion 241 of the tire trim element 24 overlies the lip 22 of the wheel rim 23 of the vehicle wheel 21, and its outer peripheral portion 2410 is flexed into contact with the side wall portion 501 of the accent stripe element 50 if and when the said accent stripe element 50 already has been mounted on the lip 22 of the vehicle wheel rim 21.

To remove the wheel trim assembly 20 from the vehicle wheel 21, the said tire trim assembly 20 is manually pulled axially outwardly therefrom preferably employing a hook-ended instrument or prying instrument to the axially inward edge of the rim trim element 26. Initially, a relatively large force is required to move the wheel trim assembly axially outwardly from the vehicle wheel 21 because of the fact that the circumferential teeth 243 of the tire trim element 24 first must be flexed and rolled over from their locked position shown in Fig. 14 to their unlocked position shown in Fig. 15 whereupon the complete removal of the wheel trim assembly 20 from the vehicle wheel 21 becomes relatively easy.

The accent stripe element 50 of the wheel trim and multi-colored tire trim construction of the invention preferably consists of an annular bead portion 500 and an annular slightly curved side wall portion 501 extending radially outwardly therefrom. The said accent stripe element 50 is preferably of either a contrasting color with respect to the selected color of the tire trim element 24, and, although the accent stripe element 50 may be formed of natural rubber, the use of synthetic rubber is preferred inasmuch as the bleed-through of carbon black is prevented from the side wall of the tire 25 to which the curved portion 501 of the said accent stripe element conforms when wheel trim and multi-colored tire trim construction of the invention is mounted on a vehicle wheel 21 as best shown in Figs. 1 and 2.

The annular bead portion 500 of the accent stripe element 50 is preferably bulbous in shape and is molded with an axially inwardly facing annular groove 502 therein for the purpose of telescoping the said annular bead portion 500 of the accent stripe element 50 firmly and snugly onto and over the outer lip 22 of the vehicle wheel rim 23. The said annular bead portion 500 of the accent stripe element 50 is reinforced by an annular wire reinforcement 503 preferably molded therein and located to become positioned axially inwardly of the outer edge of the lip 22 of the wheel rim 23 when the said accent stripe element 50 is mounted on a vehicle wheel 21.

The radially inner margin 5000 of the annular bead portion 500 of the accent strip element 50 is formed to conform with and be contacted by the inner peripheral portion 2411 of the colored side wall portion 241 of the tire trim element 24 as best shown in Fig. 11 so that the said colored side wall portion 241 of the tire trim element 24 exerts pressure in the direction of the arrows A in Figs. 2 and 11 on the annular bead portion 500 of the accent stripe element 50 when the multi-colored tire trim construction of the invention is mounted on a vehicle wheel 21. Thus, the wheel trim assembly 20 consisting of the tire trim element 24 and the rim trim element 26 co-acts with the accent stripe element 50 to assure that the latter is maintained in its firmly mounted position on the lip 22 of the wheel rim 23.

As heretofore indicated, the accent stripe element 50 may be mounted on the vehicle wheel 21 by telescoping the annular bead portion 500 thereof on the lip 22 of the vehicle wheel rim 23. Inasmuch as the tire trim element 26 is constructed of live flexible rubber, it assumes the position as best shown in Fig. 2 when the wheel trim assembly 20 consisting o fthe tire trim element 24 and rim trim element 26 is properly mounted on the vehicle wheel. Because of the molded shape of the white or colored side wall portion 241 of the tire trim element 26, not only does the inner peripheral portion 2411 thereof bear against the radially inner margin 5000 of the bead portion of the accent stripe element 50, see Fig. 11, but the outer periphery 2410 of the said colored side wall portion 241 of the tire trim element 26 is constantly flexed against the said accent stripe element 50.

Wheel and tire trim and the color accent thereof embodying the invention are self-maintained in concentric relationship on the vehicle wheels upon which they are mounted, thus avoiding the wobbly eye appeal ofttimes present in prior art wheel trim constructions. Also, the accent stripe element 50 may be mounted on or demounted from the lip 22 of the rim 23 of a vehicle wheel 21 either before or after the mounting of the wheel trim assembly 20 on the said vehicle wheel.

The invention provides an inexpensive trouble-free wheel trim and multi-colored tire trim construction which is readily and firmly mounted on a vehicle wheel, and in which the color accent element may be replaced by like color accent elements of a different color to suit the purchaser's selection, all without any major service operation, and yet, the wheel trim and multi-colored tire trim construction of the invention may be placed on a vehicle wheel and removed therefrom without damage to the paint or other finish of the vehicle wheels.

Although but a single embodiment of the invention has been shown and described in detail, it is obvious that many variations and changes may be made in the size, shape, arrangement and details of the various elements of the invention, all without departing from the spirit and scope thereof as defined in the appended claims.

We claim:

1. In combination with a vehicle wheel including a wheel rim having axially disposed inner and outer tire bead seats and a tire mounted thereon, said wheel rim having an axially outwardly extending lip at the outer periphery thereof, and a wheel and tire trim assembly mounted on the vehicle wheel including a resilient annular tire trim element of different color than said tire curved in cross section and flexed axially inwardly over the lip of the wheel rim toward the outer wall of said tire, a resilient color accent stripe element of a color different than said tire wall and said tire trim element comprising an annular bead portion and an annular radially extending side wall portion curved for flexing against the tire wall when the said accent stripe element is firmly telescopingly mounted on the lip of said wheel rim axially inwardly of said tire trim element, the said annular bead portion of said accent stripe element having an axially inwardly facing annular slot therein to admit of its firm telescopic mounting on the said wheel rim lip, the said side wall portion of the color accent stripe element being of a width to extend radially outwardly of the outer periphery of the said tire trim element of said wheel and tire trim assembly, at least the outer peripheral portion of said tire trim element bearing axially upon the side wall portion of said color accent stripe element.

2. In combination with a vehicle wheel including a wheel rim having axially disposed inner and outer tire bead seats and a tire mounted thereon, said wheel rim having an axially outwardly extending lip at the outer periphery thereof, and a wheel and tire trim assembly mounted on the vehicle wheel including a resilient annular tire trim element of different color than said tire curved in cross section and flexed axially inwardly over the lip of the wheel rim toward the outer wall of said tire, a resilient color accent stripe element of a color different than said tire wall and said tire trim element comprising an annular bead portion and an annular radially extending side wall portion curved for flexing against the tire wall when the said accent stripe element is firmly telescopingly mounted on the lip of said wheel rim axially inwardly of said tire trim element, the said annular bead portion of said accent stripe element having an axially inwardly facing annular slot therein to admit of its firm telescopic mounting on the said wheel rim lip, an annular wire reinforcement in the bead portion of said accent stripe element located radially and axially inwardly of the bottom of the said annular slot therein, the said side wall portion of the color accent stripe element being of a width to extend radially outwardly of the outer periphery of the said tire trim element of said wheel and tire trim assembly, at least the outer peripheral portion of said tire trim element bearing axially upon the side wall portion of said color accent stripe element.

3. In combination with a vehicle wheel including a wheel rim having axially disposed inner and outer tire bead seats and a tire mounted thereon, said wheel rim having an axially outwardly extending lip at the outer periphery thereof, and a wheel and tire trim assembly mounted on the vehicle wheel including a resilient annular tire trim element of different color than said tire curved in cross section and flexed axially inwardly over the lip of the rim toward the outer wall of said tire, a resilient color accent stripe element of a color different than said tire wall and said tire trim element comprising an annular bead portion and an annular radially extending side wall portion curved for flexing against the tire wall when the said accent stripe element is firmly telescopingly mounted on the lip of said wheel rim axially inwardly of said tire trim element, the said annular bead portion of said accent stripe element having an axially inwardly facing annular slot therein to admit of its firm telescopic mounting on the said wheel rim lip, an annular wire reinforcement in the bead portion of said accent stripe element located radially and axially inwardly of the bottom of the said annular slot therein, the said side wall portion of the color accent stripe element being of a width to extend radially outwardly of the outer periphery of the said tire trim element of said wheel and tire trim assembly, an intermediate peripheral portion of said tire trim element bearing against said annular bead portion of said color stripe element, and the outer peripheral portion of said tire trim element bearing axially upon the side wall portion of said color accent stripe element.

4. In a vehicle wheel structure including a wheel rim having axially disposed inner and outer tire bead seats and a tire mounted thereon, the said wheel rim having an axially outwardly extending lip at the outer periphery thereof, a wheel trim consisting of a rim and tire trim assembly and a color accent stripe element, said rim and tire trim assembly comprising a relatively rigid axially disposed annular ornamental metal rim trim member and an annular resilient tire trim member of a color other than that of the tire including an anchorage flange substantially coextensive with said ornamental member assembled therearound and an annular tire trim element extending radially outwardly from said anchorage flange and formed to overlie the outer lip of the wheel rim and flex axially inwardly toward said wheel rim lip and said tire, said color accent stripe element being of a different color than said tire trim member and said tire including an annular bead portion formed with an axially inwardly facing groove therein to admit of firmly telescopingly mounting the same on the said axially extending wheel rim lip, the said accent stripe element also including an annular side wall arcuately formed and radially extending from the said bead portion thereof to lie between the tire wall and the annular tire trim element of said tire trim member and extend radially outwardly from the outer periphery of said annular tire trim element, said annular tire trim element being formed to flex against at least one of the bead portion and side wall of the said accent stripe element whereby to cooperate in retaining it on the lip of the wheel rim.

5. In a vehicle wheel structure as claimed in claim 4, including an annular wire reinforcement in the bead portion of the said accent stripe element positioned radially inwardly of the axially inwardly facing groove therein and axially inwardly of the bottom of said groove whereby to underlie the outwardly extending wheel rim lip when the said bead portion of the accent stripe element is firmly telescoped thereon.

6. In a vehicle wheel structure including a wheel rim having axially disposed inner and outer tire bead seats and a tire mounted thereon, the said wheel rim including an axially extending lip on the outer periphery thereof, a wheel trim and multi-colored tire trim comprising a rim trim and tire trim assembly and a resilient color accent stripe element, said color accent stripe element consisting of an annular bead portion annularly slotted and telescoped firmly axially onto the said lip of the wheel rim and a curved side wall portion formed to flex and lie at least at its outer periphery against the wall of said tire, an annular wire reinforcement in said bead portion of said accent stripe element located radially and axially, inwardly of the annular slot therein whereby to lie within the annulus of said vehicle wheel within the said wheel rim lip when the bead of said accent stripe element is telescoped thereon, the said rim trim and tire trim assembly consisting of a relatively rigid annular rim trim element and a resilient tire trim element including an axially extending anchorage portion disposed around said rim trim element and a curved radially extending tire trim portion, the said rim trim element and the anchorage portion of the said tire trim element being assembled and telescopingly mounted within the outer tire bead seat of said wheel rim, the said tire trim portion of said tire trim element being formed to overlie the bead of the accent stripe element and extend over and in contact with the side wall portion thereof but sufficiently short of the outer periphery thereof to present a stripe of a contrasting color outwardly of the outer periphery of the said radially extending tire trim portion of said tire trim element.

7. In a vehicle wheel structure including a wheel rim having axially disposed inner and outer tire bead seats and a tire mounted thereon, the said wheel rim having axially extending lips at the outer periphery thereof, a wheel trim consisting of a rim and tire trim assembly and a color accent stripe element, said rim and tire trim assembly comprising a relatively rigid axially disposed annular ornamental metal rim trim member and an annular resilient tire trim member including an anchorage flange substantially coextensive with said ornamental member assembled therearound and an annular tire trim element extending radially outwardly from said anchorage flange and formed to overlie the outer lip of the wheel rim and flex axially inwardly toward said wheel rim lip and said tire, said color accent stripe element being of a different color than said tire trim member and said tire comprising an annular bead portion and an annular radially extending side wall portion, the said bead portion of said color accent stripe element having an annular mounting groove therein formed to permit the said color stripe element to be telescoped firmly on the lip of the wheel rim, an annular wire reinforcement in said bead portion of said color accent stripe element located radially and axially inwardly of the base of said annular mounting groove therein, the said side wall portion being disposed between the tire wall and the annular tire trim element of said tire trim member and of a width to extend radially outwardly therefrom the said side wall portion of said color accent stripe element being curved to flex against the side wall of the said tire, the said annular tire trim element bearing against the said color accent stripe element thereby cooperating in retaining it on the wheel rim.

References Cited in the file of this patent

FOREIGN PATENTS 1,061,278    France    Nov. 25, 1953